United States Patent
Yang et al.

(10) Patent No.: US 12,436,932 B2
(45) Date of Patent: Oct. 7, 2025

(54) INDEX ENTRY GENERATING METHODS, APPARATUSES, AND DEVICES FOR LARGE OBJECT DATA BLOCK INDEX

(71) Applicant: Beijing OceanBase Technology Co., Ltd., Beijing (CN)

(72) Inventors: Zhenkun Yang, Beijing (CN); Yi Zhang, Beijing (CN); Hongdi Luo, Beijing (CN)

(73) Assignee: Beijing OceanBase Technology Co., Ltd., Beijing (CN)

( * ) Notice: Subject to any disclaimer, the term of this patent is extended or adjusted under 35 U.S.C. 154(b) by 45 days.

(21) Appl. No.: 18/491,341

(22) Filed: Oct. 20, 2023

(65) Prior Publication Data

US 2024/0134837 A1   Apr. 25, 2024
US 2024/0232155 A9   Jul. 11, 2024

(30) Foreign Application Priority Data

Oct. 21, 2022 (CN) .......................... 202211295550.1

(51) Int. Cl.
*G06F 16/22* (2019.01)

(52) U.S. Cl.
CPC ...... *G06F 16/2219* (2019.01); *G06F 16/2272* (2019.01)

(58) Field of Classification Search
CPC ............ G06F 16/2219; G06F 16/2272; G06F 16/2282; G06F 16/2474
See application file for complete search history.

(56) References Cited

U.S. PATENT DOCUMENTS

| | | | |
|---|---|---|---|
| 2010/0189122 A1* | 7/2010 | Dandekar | H04L 65/65 370/412 |
| 2014/0081986 A1* | 3/2014 | Lee | G06F 16/13 707/747 |
| 2015/0278327 A1* | 10/2015 | Raghavan | G06F 9/466 707/615 |
| 2016/0283537 A1* | 9/2016 | Chen | G06F 16/2282 |
| 2020/0218725 A1* | 7/2020 | Cheriton | G06F 16/2458 |
| 2020/0372004 A1* | 11/2020 | Barber | G06F 7/08 |
| 2022/0358178 A1* | 11/2022 | Wang | G06F 16/9532 |

* cited by examiner

*Primary Examiner* — Huawen A Peng
(74) *Attorney, Agent, or Firm* — Fish & Richardson P.C.

(57) ABSTRACT

Implementations of this specification provide methods and apparatuses for generating index entries. One method includes: acquiring a first sequence number of front large object data that is adjacent to a target data to be inserted in a large object data, wherein the first sequence number is generated based on a first code arrangement sequence and is comprised in a first index entry corresponding to the front large object data, in response to determining that the second sequence number immediately following the first sequence number is occupied, determining, based on a second code arrangement sequence, a branch index sequence number for the target data, and adding an index entry comprising the branch index sequence number to an index of the large object data, wherein the index entry is added between the first index entry comprising the first sequence number and a second index entry comprising the second sequence number.

20 Claims, 11 Drawing Sheets

INDEX ENTRY GENERATING METHODS, APPARATUSES, AND DEVICES FOR LARGE OBJECT DATA BLOCK INDEX

CROSS-REFERENCE TO RELATED APPLICATIONS

This application claims priority to Chinese Patent Application No. 202211295550.1, filed on Oct. 21, 2022, which is hereby incorporated by reference in its entirety.

TECHNICAL FIELD

This application relates to the field of database technologies, and in particular, to index entry generating methods, apparatuses, and devices for a large object data block index.

BACKGROUND

A large object (LOB) is a data type used to store data with a large data volume, and is applied to service fields with a quite large data volume, such as a medical record (e.g., an X-ray), a video, and an image. At present, the LOB is further divided into BLOB and CLOB: (1) CLOB, i.e., a character-type large object, which is related to a character set and is applicable to storing text-type data such as a document and voluminous works, and XML data; (2) BLOB, i.e., a binary large object, which is applicable to storing byte stream data such as an image and audio. Extra-large LOB data include two levels of meanings: 1. A value of an LOB field in a specific row in a table is huge. 2. The value of the LOB field is not excessively large, but there are many rows in the table, so a total data volume in the LOB field is huge.

In most commercial or open source databases, management is based on a storage block (e.g., a page/chunk/block). For a common data type, one data row does not cross a plurality of storage blocks. A large object can support very large data (for example, the Oracle can support a large object of 128T). A data column of the large object generally exceeds a single storage block. Therefore, a storage management method for a large object needs to be separately designed.

In a conventional technology, for example, for a commercial database or an open source database, complex special processing is mainly performed on a large object in a storage engine to process a difference between a large object and common type data. However, a serious write amplification problem is easily caused during an operation such as insertion of a large object.

SUMMARY

Some embodiments of this specification provide index entry generating methods, apparatuses, and devices for a large object data block index, so as to effectively alleviate a write amplification problem caused when an existing database performs an LOB type data insertion operation.

To alleviate the above-mentioned technical problem, some embodiments of this specification provide the following solutions:

Some embodiments of this specification provide an index entry generating method for a large object data block index, where the method includes: acquiring a first sequence number, where the first sequence number is a sequence number of front large object data that are in stored large object data and that are adjacent to target data in a data dimension, the target data are to-be-inserted data that need to be inserted into the stored large object data, and the first sequence number is generated based on a first code arrangement sequence; determining, based on the first code arrangement sequence, whether a second sequence number that is adjacent to the first sequence number and that is located after the first sequence number is occupied, to obtain a first determining result; in response to that the first determining result indicates that the second sequence number is occupied, determining a branch index sequence number of the target data in the large object data block index based on a second code arrangement sequence; and adding an index entry including the branch index sequence number to the large object data block index, where a location of the index entry including the branch index sequence number in the large object data block index is disposed between an index entry of the first sequence number and an index entry of the second sequence number.

Some embodiments of this specification provide an index entry generating apparatus for a large object data block index, where the apparatus includes: an acquisition module, configured to acquire a first sequence number, where the first sequence number is a sequence number of front large object data that are in stored large object data and that are adjacent to target data in a data dimension, the target data are to-be-inserted data that need to be inserted into the stored large object data, and the first sequence number is generated based on a first code arrangement sequence; a judgment module, configured to determine, based on the first code arrangement sequence, whether a second sequence number that is adjacent to the first sequence number and that is located after the first sequence number is occupied, to obtain a first determining result; a determination module, configured to: in response to that the first determining result indicates that the second sequence number is occupied, determine a branch index sequence number of the target data in the large object data block index based on a second code arrangement sequence; and a generation module, configured to add an index entry including the branch index sequence number to the large object data block index, where a location of the index entry including the branch index sequence number in the large object data block index is disposed between an index entry of the first sequence number and an index entry of the second sequence number.

Some embodiments of this specification provide an index entry generating device for a large object data block index, where the device includes: at least one processor; and a memory communicatively connected to the at least one processor, where the memory stores an instruction that can be executed by the at least one processor, and the instruction is executed by the at least one processor to enable the at least one processor to perform the following operations: acquiring a first sequence number, where the first sequence number is a sequence number of front large object data that are in stored large object data and that are adjacent to target data in a data dimension, the target data are to-be-inserted data that need to be inserted into the stored large object data, and the first sequence number is generated based on a first code arrangement sequence; determining, based on the first code arrangement sequence, whether a second sequence number that is adjacent to the first sequence number and that is located after the first sequence number is occupied, to obtain a first determining result; in response to that the first determining result indicates that the second sequence number is occupied, determining a branch index sequence number of the target data in the large object data block index based on a second code arrangement sequence; and adding an index entry including the branch index sequence number to the large object data block index, where a location of the index entry including the branch index sequence number in the large object data block index is disposed between an index entry of the first sequence number and an index entry of the second sequence number.

At least one embodiment provided in this specification can achieve the following beneficial effects:

When target data are inserted, a first sequence number of front large object data that are in stored large object data and that are adjacent to the target data in a data dimension is acquired. When a second sequence number is occupied, a branch index sequence number of the target data is determined based on a second code arrangement sequence different from a first code arrangement sequence, and an index entry including the branch index sequence number is added to a large object data block index. As such, management of the large object data is converted into management of the large object data block index, thereby effectively alleviating a read/write amplification problem during the large object management. In addition, using a branch index sequence number coding method can avoid impact on a sequence number coding sequence of the stored large object data block index, without a need to perform coding again on all large object data block indexes, thereby effectively simplifying a data insertion operation procedure.

BRIEF DESCRIPTION OF DRAWINGS

To describe the technical solutions in some embodiments of this specification or in a conventional technology more clearly, the following briefly describes the accompanying drawings needed for describing the embodiments or the conventional technology. Clearly, the accompanying drawings in the following descriptions merely show some embodiments of this application, and a person of ordinary skill in the art can still derive other drawings from these accompanying drawings without creative efforts.

DESCRIPTION OF EMBODIMENTS

To make the objectives, technical solutions, and advantages of one or more embodiments of this specification clearer, the following clearly and comprehensively describes the technical solutions in one or more embodiments of this specification with reference to some specific embodiments of this specification and the corresponding accompanying drawings. Clearly, the described embodiments are merely some but not all of embodiments of this specification. All other embodiments obtained by a person of ordinary skill in the art based on some embodiments of this specification without creative efforts shall fall within the protection scope of one or more embodiments of this specification.

The following describes in detail the technical solutions provided in some embodiments of this specification with reference to the accompanying drawings.

In the conventional technology, since the LOB includes an insertion operation, when data of a large object are inserted, one new storage block is inserted between two consecutive storage blocks during operation. In the conventional technology, content or a sequence number after the inserted storage block is moved backward by one level, and all storage blocks after the inserted data usually need to be migrated or recoded, increasing operation difficulty. In such case, original storage blocks arranged in sequence are disordered, causing confusion of a sequence number, and causing a serious write amplification problem. It can be understood that, in the conventional technology, an LOB-type data insertion operation of a database is not friendly, and the data insertion operation is complex and inefficient, failing to achieve an expected effect.

Figure 1:
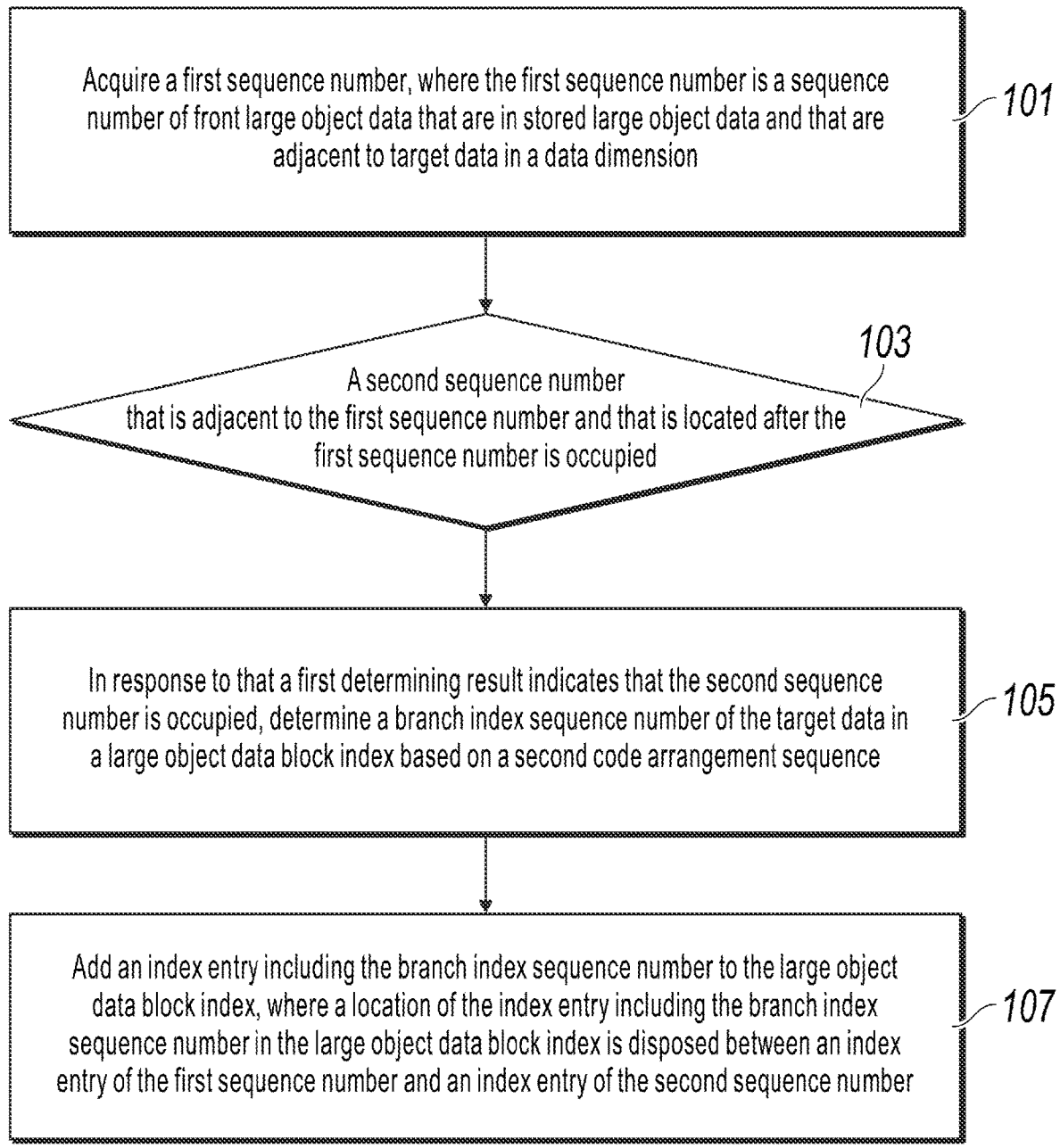
FIG. 1 is a schematic flowchart illustrating an index entry generating method for a large object data block index, according to some embodiments of this specification.

To alleviate deficiencies of the conventional technology, this solution provides the following embodiments:

FIG. 1 is a schematic flowchart illustrating an index entry generating method for a large object data block index, according to some embodiments of this specification. An execution body of a large object management method provided in some embodiments of this specification can be a database server.

As shown in FIG. 1, the index entry generating method for a large object data block index can include the following steps:

Step 101: Acquire a first sequence number, where the first sequence number is a sequence number of front large object data that are in stored large object data and that are adjacent to target data in a data dimension, the target data are to-be-inserted data that need to be inserted into the stored large object data, and the first sequence number is generated based on a first code arrangement sequence.

In some embodiments of this specification, the target data can be to-be-stored large object data, and need to be inserted into the stored large object data. Specifically, the target data can be a data piece or complete data, or can be a set of a plurality of pieces of data, which is not specifically limited here.

In some specific application scenarios, in one data insertion process, there can be one or more pieces of target data, and insertion locations of the plurality of pieces of target data can be the same or different, which is not specifically limited here.

In the stored large object data that the target data need to be inserted into, for a data dimension, an insertion location of the target data has a front large object and a rear large object that are adjacent to each other, and the first sequence number can be a sequence number that the front large object is mapped to.

The first code arrangement sequence can be a sequence number code arrangement rule of a level sequence number that the first sequence number is located at, and the first sequence number is generated based on the first code arrangement sequence.

For example, if the first sequence number is a level sequence number located at a first level (level 1), level sequence numbers of the first level are all successively arranged based on a first code arrangement sequence, where the first code arrangement sequence can be specifically natural numbers, letters, or a series of other identifiers that can indicate a sequence, which is not specifically limited here.

In some embodiments of this specification, before step 101 is performed, a mapping relationship between a large object data block index and a storage location of large object data can be constructed in advance, and sequence number coding is performed on the large object data block index successively based on a predetermined sequence. Specifically, the predetermined sequence can be an established arrangement sequence of the large object data block index, and can be specifically the first code arrangement sequence or the like, which is not specifically limited here.

The large object data block index (Lob Meta) can be a stored large object data piece (Lob Data Piece) or a query index of stored large object data. One large object data piece or one piece of large object data is managed by using one large object data block index, and corresponding sequence number coding (Sequence id) is performed on each large object data block index to generate a matched sequence number. A record of a large object data block index is generally small, and occupies small memory space. Converting management of the large object data into management of a set of large object data block indexes can effectively alleviate a read/write amplification problem during the large object management.

During the large object management, data rows are sorted based on a primary key. Lob Meta is managed based on a table. To obtain good location-based query performance, accurate storage location information of Lob Data Piece needs to be introduced into the key of the table. Therefore, in the large object management methods provided in some embodiments of this specification, a sequence number code of a large object data block index is used as a query index of storage location information of the Lob Piece Data, and a size of the sequence number code indicates a relative location of the large object data block index.

Specifically, the acquiring an insertion location of the target data can include: querying a front large object associated with the target data in the data dimension from the stored large object data; and determining the insertion location of the target data based on a storage location of the front large object.

For example, the target data are a segment of text that needs to be inserted into a target large text. In such case, a large object data piece corresponding to the target large text and a storage location can be acquired from the stored large object data, so as to determine a storage location of the to-be-inserted segment of text, namely, the insertion location of the target data.

As such, by determining the insertion location of the target data, large object data indexes on two sides of the insertion location of the target data and sequence numbers corresponding to the large object data indexes can be determined.

Further, before the acquiring a first sequence number, the method can further include: reserving a backup coding interval of a predetermined coding length in a coding interval of the first code arrangement sequence, where the backup coding interval is used for subsequent sequence number coding for the to-be-inserted target data.

In some embodiments of this specification, the coding interval of the first code arrangement sequence can be a coding interval corresponding to a level sequence number in which sequence number coding is performed based on the first code arrangement sequence. For example, in the above-mentioned example, a sequence number of the first level (level 1) is arranged based on the first code arrangement sequence. In such case, a coding interval corresponding to the sequence number of the first level is the coding interval of the first code arrangement sequence.

A backup coding interval of a predetermined coding length is reserved in the coding interval of the first code arrangement sequence for sequence number coding when the target data are inserted and stored subsequently. As such, there is no need to perform a branch index operation each time data are inserted, thereby effectively avoiding fast stacking of level sequence numbers.

In some actual application scenarios, sequence number coding can be variable-length coding of varchar (a maximum byte length is 16 KB, where B is an acronym of Byte). Generally, a coding interval of 32 bits (1B=8 bits, 32 bits=4B) can be used as a sequence number coding interval of one level (namely, one branch index). Therefore, branches of 16 KB/4B=4K (4*1024=4096) levels in total can be represented. Generally, one branch index is generated for one data insertion operation, which increases a quantity of sequence number coding levels once, i.e., one branch index is formed. Consequently, branch codes of 4096 levels are used up quickly.

In such case, a backup coding interval of a predetermined coding length can be reserved in branch sequence number coding at each level as a step size. Specifically, if a predetermined coding length reserved at a level is 8B, a remaining coding interval is used as an initial occupation interval of sequence number coding at the current level. During insertion of the target data, the reserved coding interval can be first used for sequence number coding of the target data. In such case, the predetermined coding length can support eight times of sequence number coding operations at worst. In such case, before the reserved coding interval is used up, insertion of the target data does not form a new branch index. As such, consumption of branch codes of eight levels can be reduced at each level, thereby avoiding quick increase of a quantity of branch coding levels, and providing sufficient coding space for sequence number coding.

Step 103: Determine, based on the first code arrangement sequence, whether a second sequence number that is adjacent to the first sequence number and that is located after the first sequence number is occupied, to obtain a first determining result.

In some embodiments of this specification, the first sequence number corresponding to the front large object and the second sequence number corresponding to the rear large object that are arranged in sequence on two sides of the insertion location of the target data can exist or be null.

To be specific, if both the first sequence number and the second sequence number exist, the target data are inserted between the two pieces of large object data. However, if the first sequence number is null, the target data are inserted before the large object data corresponding to the second sequence number; or if the second sequence number is null, the target data are inserted after the large object data corresponding to the first sequence number.

Specifically, the method can further include: in response to that the first determining result indicates that the second sequence number is not occupied, determining, based on the first code arrangement sequence, the second sequence number that is adjacent to the first sequence number and that is located after the first sequence number as a sequence number corresponding to the target data.

In some embodiments of this specification, the second sequence number is not occupied, indicating that the second sequence number is null or does not exist. In such case, a sequence number corresponding to the target data is appended and arranged in sequence after the first sequence number. In such case, the target data are directly inserted after the large object data corresponding to the first sequence number.

Then, the second sequence number arranged in sequence after the first sequence number can be determined as the sequence number corresponding to the target data. For example, if the first sequence number is 5, the second sequence number should be 6 based on sequential arrangement, which belongs to sequence number coding of the same level.

Step 105: In response to that the first determining result indicates that the second sequence number is occupied, determine a branch index sequence number of the target data in the large object data block index based on a second code arrangement sequence.

In some embodiments of this specification, the second sequence number is occupied, indicating that both the front large object and the rear large object on two sides of the insertion location of the target data exist. In such case, the target data are inserted between the front large object and the rear large object.

Then, a branch index sequence number corresponding to the target data can be generated between the first sequence number and the second sequence number based on a second code arrangement sequence. The second code arrangement sequence can be a sequence in which code arrangement is performed on a sequence number in a branch index, and the second code arrangement sequence can be specifically natural numbers, letters, or a series of other identifiers that can indicate a sequence, which is not specifically limited here.

Specifically, the branch index can mean that a branch is added at the insertion location of the to-be-inserted target data on the basis of the existing large object data block index, and a branch sequence number code is correspondingly generated based on the second code arrangement sequence. In some specific application scenarios, for ease of management, a target sequence number can be generated by using the first sequence number as a reference.

In some embodiments of this specification, the second code arrangement sequence can specifically include: in response to that a coding form of the first sequence number is a value, a coding form of the branch index sequence number is also a value, and a value corresponding to the branch index sequence number is greater than a value corresponding to the first sequence number.

For example, if the first sequence number is 1 based on the first code arrangement sequence and the second sequence number is 2, branch index sequence numbers 1.1, 1.2, 1.3, etc. can be generated based on the second code arrangement sequence. These sequence numbers do not belong to the same level as the first sequence number and the second sequence number.

The branch index is set such that when the target data are inserted, the sequence number of the target data is set to a branch index at a next level, and branch sequence number coding is performed again, thereby avoiding an operation such as performing code sorting again on a sequence number code corresponding to an existing large object data block index that is arranged in sequence.

Specifically, sequence number coding at the same level can be sequence number coding that belongs to the same branch. For example, the first branch can be specifically defined as the first level (level 1). On the basis of the first branch, an added second level branch is defined as the second level (level 2). By analogy, there can be a third level (level 3) branch, a fourth level (level 4) branch, etc. in sequence from top to bottom, which is not specifically limited here.

Step 107: Add an index entry including the branch index sequence number to the large object data block index, where a location of the index entry including the branch index sequence number in the large object data block index is disposed between an index entry of the first sequence number and an index entry of the second sequence number.

In some embodiments of this specification, an index entry can refer to a storage record for each piece of stored large object data in the large object data block index, and is used to store a mapping relationship among a data identifier, a sequence number, a storage location, a coding length, etc. of the large object data, facilitating subsequent query of the stored large object data.

Further, to facilitate query of the large object data, index entries of a branch index sequence number are added to an index entry of the first sequence number and an index entry of the second sequence number. In other words, an arrangement sequence of index entries is the same as an arrangement sequence of corresponding sequence numbers.

In some embodiments of this specification, the method can further include: in response to that a coding length of the stored sequence number exceeds a predetermined coding length, triggering an offline update operation on the stored sequence number.

In some actual application scenarios, if 8B is used as a step size, and one step size can support sequence number coding for eight times of insertion operations at worst, a data insertion operation is performed at the same insertion location between two consecutive large object data block indexes, and available sequence number coding is acquired according to a bisection method each time. As such, even in the worst case, 32k (8*4K=32*1024=32768) times of sequence number coding operations can be supported. However, since a data volume of a large object is large, sequence number coding cannot be continued after 32k times of sequence number coding operations are completed.

In such case, a trigger condition that a coding length of the stored sequence number exceeds a predetermined coding length is set to trigger offline update of the stored sequence number code.

For example, if the longest sequence number code of the large object data exceeds 8k, an offline sequence number code update task can be triggered once at the back end, thereby updating the sequence number code so as to reserve specific coding space for further coding, and avoiding impact of the sequence number code update on service data of a service running in the foreground.

In some embodiments of this specification, the performing an offline update operation on the stored sequence number can specifically include: determining, based on a sequence number of a stored index entry, an index entry that needs to be collated, where a sequence number of the index entry that needs to be collated includes at least a sequence number based on the first code arrangement sequence and a sequence number based on the second code arrangement sequence; and performing sequence number coding again on the index entry that needs to be collated based on the first code arrangement sequence.

The offline update and collation operation of the sequence number can refer to updating and collating the branch index sequence numbers into the level sequence number of the first code arrangement sequence, i.e., combining the branch index sequence numbers. To facilitate the offline update and collation operation of the sequence number, the offline update and collation operation can be performed based on the index entries stored in the large object data block index.

Specifically, an index entry that needs to be collated can be determined based on sequence numbers of the stored index entries, i.e., a sequence number range that needs to be updated is determined, and then sequence number coding is performed again on the index entry that needs to be collated based on the first code arrangement sequence. In some actual application scenarios, the sequence number range that needs to be updated can be selected as needed for updating. For example, some sequence number codes with many branch index levels can be selected for sequence number code update.

Further, before the performing sequence number coding again on the index entry that needs to be collated based on the first code arrangement sequence, the method can further include: determining a coding interval used for performing sequence number coding again; and reserving a coding interval of a predetermined range in the coding interval used for performing sequence number coding again, where the coding interval of the predetermined range is used for subsequent sequence number coding for the to-be-stored target data.

In some embodiments of this specification, the coding interval used for performing sequence number coding again can be a coding interval in which sequence number ranges that need to be updated are combined and collated. The coding interval of the predetermined range is reserved in the coding interval used for performing sequence number coding again, and can be used for subsequent sequence number coding for the to-be-stored target data. As such, offline update and collation can be performed on sequence number coding without affecting subsequent sequence number coding for a data insertion operation or a data appending operation.

Further, the performing sequence number coding again on the index entry that needs to be collated based on the first code arrangement sequence can specifically include: determining one of two endpoint sequence numbers of the reserved coding interval of the predetermined range as a start sequence number; and performing sequence number coding again on a sequence number of the index entry that needs to be collated, by using the start sequence number as a collation start point.

In some embodiments of this specification, one of two endpoint sequence numbers of the reserved coding interval of the predetermined range is used as a start sequence number, and then offline collation is performed on the sequence number codes based on a predetermined collation sequence by using the start sequence number as a collation start point.

As such, a primary key conflict does not occur between a reconstructed sequence number and an original sequence number.

In some application embodiments, the performing sequence number coding again on a sequence number of the index entry that needs to be collated, by using the start sequence number as a collation start point can specifically include: in response to that the start sequence number is a front endpoint sequence number in the coding interval of the predetermined range, performing sequence number coding again on the sequence number of the index entry that needs to be collated from rear to front in a direction opposite to an arrangement sequence of the sequence number of the index entry that needs to be collated, by using the start sequence number as the collation start point.

In some other application embodiments, the performing sequence number coding again on a sequence number of the index entry that needs to be collated, by using the start sequence number as a collation start point can specifically include: in response to that the start sequence number is a rear endpoint sequence number in the coding interval of the predetermined range, performing sequence number coding again on the sequence number of the index entry that needs to be collated from front to rear in an arrangement sequence of the sequence number of the index entry that needs to be collated, by using the start sequence number as the collation start point.

Specifically, the offline update range can refer to a coding interval with many branch levels, or the like. A specific offline update range is not specifically limited here. For example, a range of a coding interval [20, 60] includes 10 branch indexes, and occupies large coding space, and therefore can be updated offline. The branch coding at the uppermost level in the offline update range can refer to a branch located at the uppermost level in such range. In the above-mentioned example, for the 10 branch indexes in the range of the coding interval [20, 60], branch levels are successively a second level, a third level, . . . , until an eleventh level from top to bottom. In such case, the uppermost level is the second level branch, and all the 10 branch indexes are sorted and coded again based on a coding sequence of the second level branch. In some embodiments of this specification, it is assumed that there are two codes with different numbers of bits, and a level of code with a larger number of bits is located above a level of code with a less number of bits.

For example, if the sequence number codes of the first level branch are 1, 2, 3, and 4, and the sequence number codes of the second level branch between 1 and 2 are 1.1, 1.2, and 1.3, the sequence number codes of the two levels are recoded based on a coding sequence of the sequence number codes of the first level branch, i.e., the sequence number codes of the second level branch are updated and combined into the first level branch.

Specifically, the predetermined coding space is [0, 100]. If the coding space of [76, 100] is reserved based on an update sequence from rear to front for a subsequent data appending operation, the original sequence number code 4 is updated to the sequence number code 75, the original sequence number code 3 is updated to the sequence number code 74, and so on. A specific code update result is shown in the following Table 1. It is worthwhile to note that, in some other application embodiments, during initial setting of the coding space [0, 100], before the sequence number code is updated offline, a part of the coding space can be reserved for subsequent offline update. In this example, it can be assumed that the initially reserved coding space is [50, 75], and it can be ensured that the currently used updated sequence number code is within the reserved coding space.

TABLE 1

Offline update result table of sequence number codes

| Original sequence number code | Updated sequence number code |
|---|---|
| 4 | 75 |
| 3 | 74 |
| 2 | 73 |
| 1.3 | 72 |
| 1.2 | 71 |
| 1.1 | 70 |
| 1 | 69 |

During offline update of sequence number codes, updating from rear to front can ensure that when sequence number codes are updated, a recoded sequence number code is not smaller than the original sequence number code. As such, a primary key conflict does not occur, i.e., a primary key does not conflict with an existing sequence number code. After the update, a specific range of coding space can be further reserved after the last sequence number code, which does not affect a subsequent data appending operation.

Another method of updating from front to rear can ensure that when sequence number codes are updated, a recoded sequence number code is not larger than the original sequence number code. As such, a primary key conflict does not occur. After the update, a specific range of coding space can be further reserved before the foremost sequence number code, which can be used for a subsequent data insertion operation.

In the above-mentioned example, according to the method of updating from front to rear, the coding space of [0, 25] is reserved for a subsequent data insertion operation, and the original sequence number code 1 is updated to the sequence number code 26, and so on. A specific code update result is shown in the following Table 2.

TABLE 2

Offline update result table of sequence number codes

| Original sequence number code | Updated sequence number code |
|---|---|
| 1 | 26 |
| 1.1 | 27 |
| 1.2 | 28 |
| 1.3 | 29 |
| 2 | 30 |

TABLE 2-continued

Offline update result table of sequence number codes

| Original sequence number code | Updated sequence number code |
|---|---|
| 3 | 31 |
| 4 | 32 |

According to the index entry generating method for a large object data block index provided in some embodiments of this specification, when target data are inserted, a first sequence number of front large object data that are in stored large object data and that are adjacent to the target data in a data dimension is acquired. When a second sequence number that is adjacent to the first sequence number and that is located after the first sequence number is occupied, a branch index sequence number of the target data is determined based on a second code arrangement sequence different from a first code arrangement sequence, and an index entry including the branch index sequence number is added to a large object data block index. As such, management of the large object data is converted into management of the large object data block index, thereby effectively alleviating a read/write amplification problem during the large object management. In addition, using a branch index sequence number coding method can avoid impact on a sequence number coding sequence of the stored large object data block index, without a need to perform coding again on all large object data block indexes, thereby effectively simplifying a data insertion operation procedure.

Figure 2:
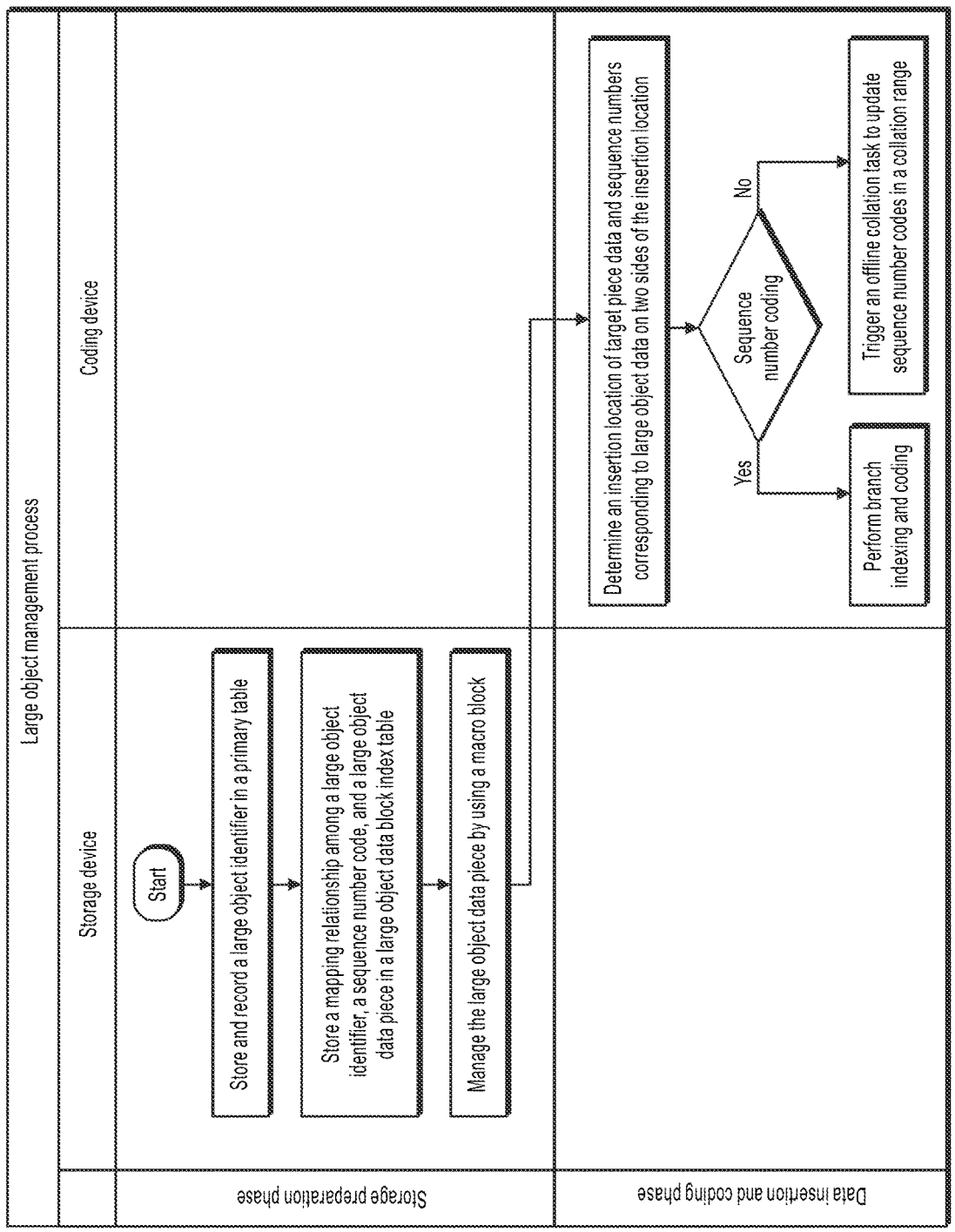
FIG. 2 is a swimlane diagram illustrating an index entry generating method for a large object data block index corresponding to FIG. 1, according to some embodiments of this specification.

FIG. 2 is a swimlane diagram illustrating a corresponding index entry generating method for a large object data block index, according to some embodiments of this specification.

As shown in FIG. 2, in a storage preparation phase, a storage device stores and records a large object identifier in a primary table in advance, a large object data block index table stores a mapping relationship among a large object identifier, a sequence number code, and a large object data piece, and the large object data piece is managed by using a macro block.

Figure 3:
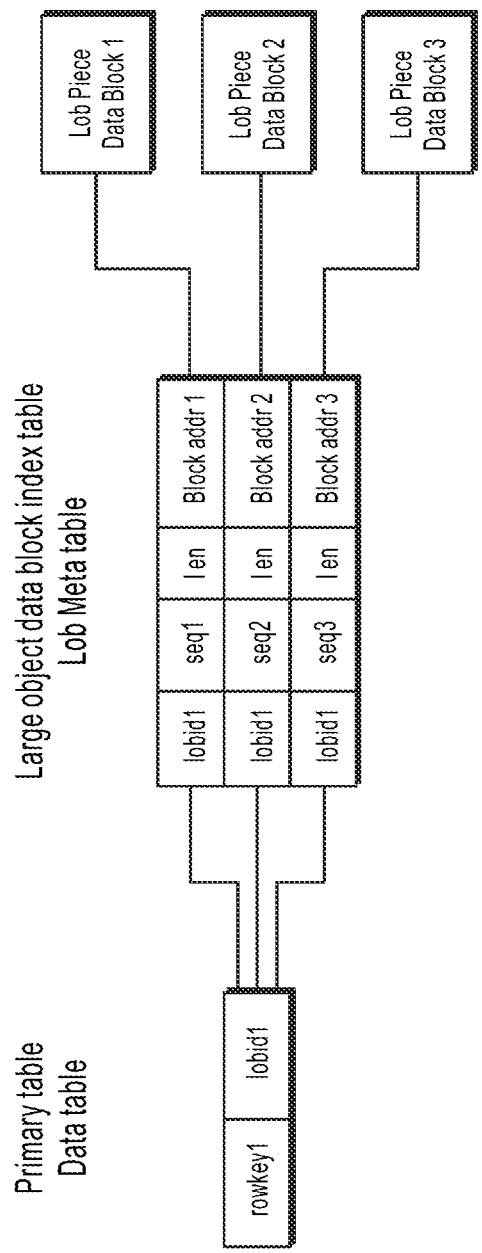
FIG. 3 is a schematic diagram illustrating a mapping relationship among a primary table, a large object data block index table, and a large object data block, according to some embodiments of this specification.

A schematic diagram of a specific application in the storage preparation phase is shown in FIG. 3. FIG. 3 is a schematic diagram illustrating a mapping relationship among a primary table, a large object data block index table, and a large object data block, according to some embodiments of this specification.

In some embodiments of this specification, the storage preparation phase is explained and described by using an OceanBase database as an example. In the OceanBase database, a unit of data file allocation space is referred to as a marco block. Each macro block is divided into some micro blocks of a 16k size. The micro block is a minimum unit (equivalent to a block of a conventional database) of each database IO, and various data in the database are stored in the micro block. A size of the macro block is 2M, the OceanBase uses the LSM Tree structure to store data, and the data are sorted based on the primary key of the table. Therefore, a macro block of the OceanBase can be split, and if data are deleted, adjacent macro blocks can be combined.

In a data insertion and coding phase, the coding device determines an insertion location of the target data and sequence number codes corresponding to large object data on two sides of the insertion location.

Then, the coding device determines whether sequence number coding can be performed. If the coding can be performed, the coding device performs branch indexing and coding operations on the target data. If the coding cannot be performed, the coding device triggers an offline update task to update sequence number codes in an update range offline.

With reference to FIG. 4 to FIG. 8, the following describes in detail the branch indexing and coding operations and the offline update task operation that are provided in some embodiments of this specification.

Figure 4:
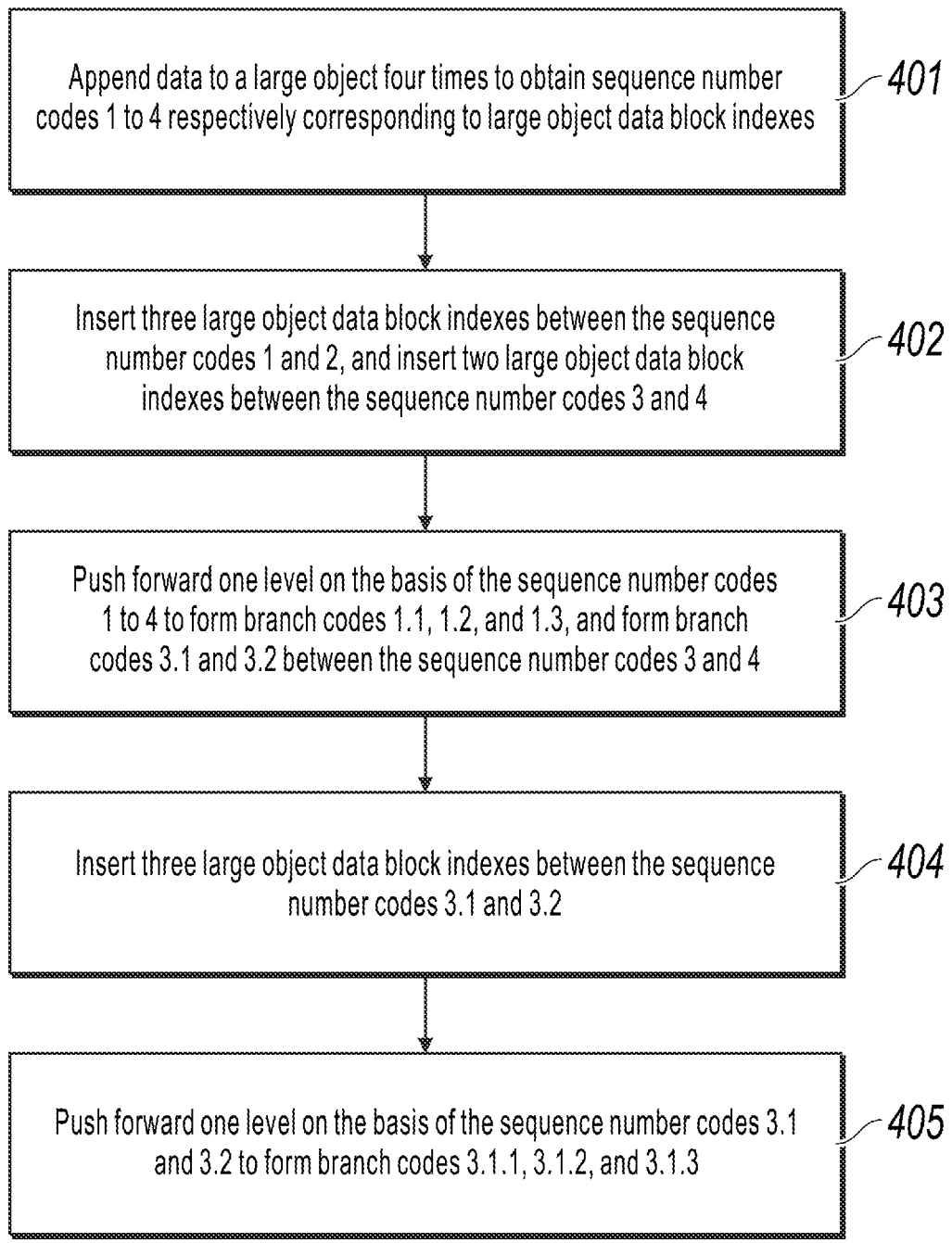
FIG. 4 is a schematic flowchart illustrating a specific application of sequence number coding in an index entry generating method for a large object data block index corresponding to FIG. 1, according to some embodiments of this specification.
Figure 5:
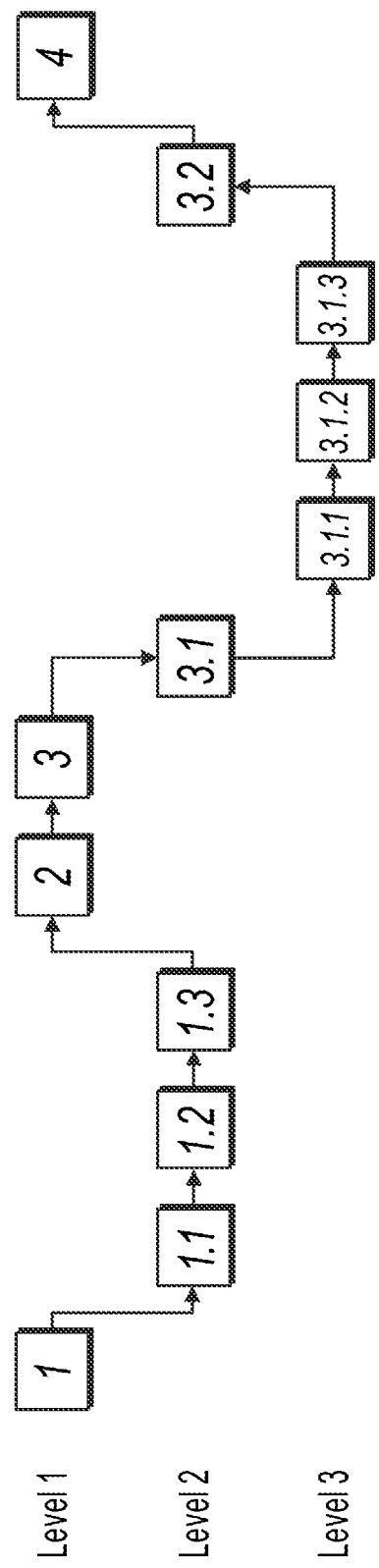
FIG. 5 is a schematic diagram illustrating some examples of an index entry generating method for a large object data block index, according to some embodiments of this specification.

FIG. 4 is a schematic flowchart illustrating a specific application of sequence number coding in an index entry generating method for a large object data block index, according to some embodiments of this specification. FIG. 5 is a schematic diagram illustrating a specific application scenario corresponding to FIG. 4.

Some embodiments of this specification describe in detail a coding method for a sequence number code, and specifically provide a variable-length Varchar coding method. Specific operation steps are as follows:

Step 401: Append data to a large object four times for storage to obtain sequence number codes 1 to 4 respectively corresponding to large object data block indexes.

Step 402: Insert three large object data block indexes between the sequence number codes 1 and 2, and insert two large object data block indexes between the sequence number codes 3 and 4.

Step 403: Push forward one level on the basis of the sequence number codes 1 to 4 to form branch codes 1.1, 1.2, and 1.3, and form branch codes 3.1 and 3.2 between the sequence number codes 3 and 4.

Step 404: Insert three large object data block indexes between the sequence number codes 3.1 and 3.2.

Step 405: Push forward one level on the basis of the sequence number codes 3.1 and 3.2 to form branch codes 3.1.1, 3.1.2, and 3.1.3.

Specifically, as shown in FIG. 5, sequence number codes 1 to 4 are located at a first level, branch codes 1.1, 1.2, and 1.3, and branch codes 3.1 and 3.2 are located at a second level, and branch codes 3.1.1, 3.1.2, and 3.1.3 are located at a third level.

Figure 6:
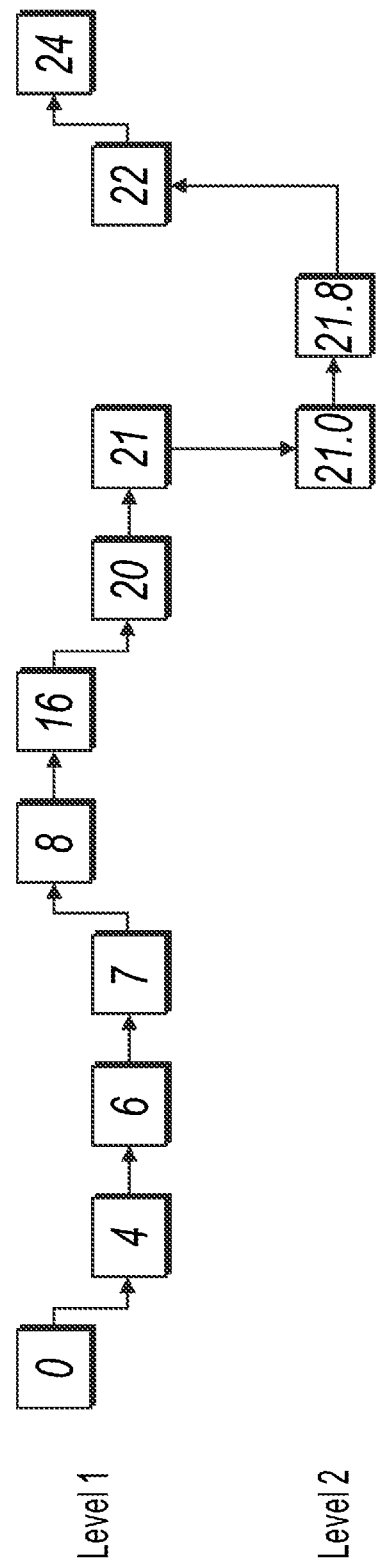
FIG. 6 is a schematic diagram illustrating some other examples of an index entry generating method for a large object data block index, according to some embodiments of this specification.

FIG. 6 is a schematic diagram illustrating another specific application of sequence number coding in an index entry generating method for a large object data block index, according to some embodiments of this specification.

In some specific application scenarios, the sequence number coding is variable-length coding of varchar (16 KB), and 32 bits are used as one level of branch coding, so a total of 4K levels of branch coding can be represented. A predetermined step size of the large object data block index is 1 bit. As shown in FIG. 4 and FIG. 5, one data insertion operation increases a quantity of coding levels once. Therefore, to prevent a quantity of branch coding levels from being easily increased, a coding length of 8B is reserved in coding space of each level as a step size.

According to such a coding method, varchar (16K) can code up to 4K levels of branch coding. 24$b$ coding space at each level is used for sequential coding, and 16M sequence number codes can be coded in sequence. Considering that an 8B coding length is used as a step size, one step size can support sequence number coding for eight times of data insertion operations at worst. To be specific, the data insertion operation is performed between two consecutive large object data indexes. As such, even in the worst case, 32K times of sequence number coding operations can be supported.

Figure 7:
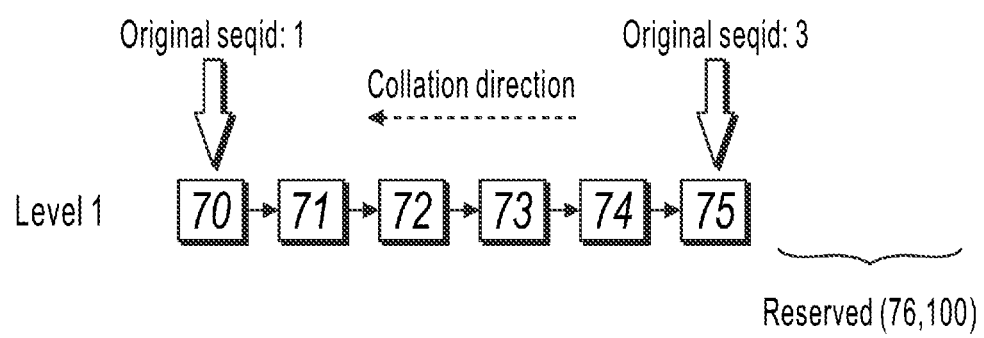
FIG. 7 is an example schematic diagram illustrating offline update of forward sequence number coding in an index entry generating method for a large object data block index, according to some embodiments of this specification.
Figure 8:
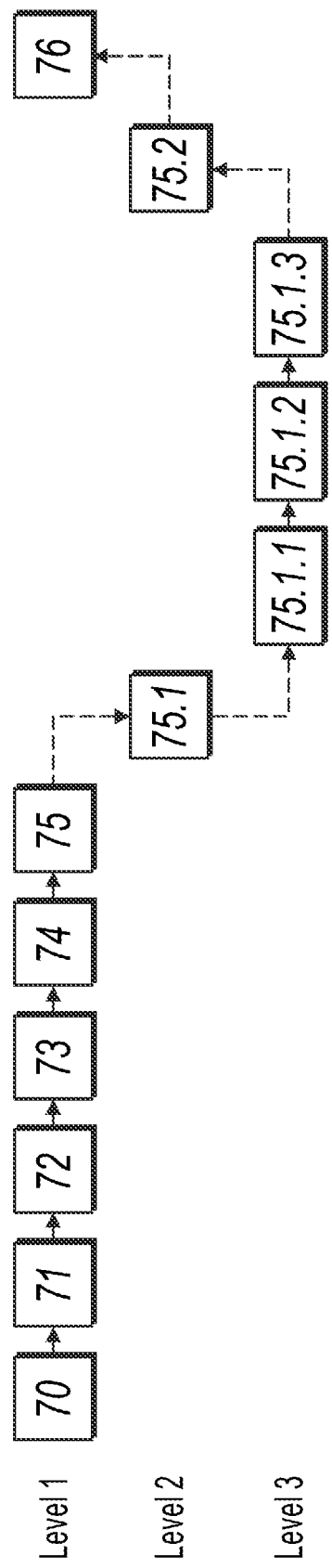
FIG. 8 is an example schematic diagram illustrating offline update of sequence number coding in an index entry generating method for a large object data block index, according to some embodiments of this specification.
Figure 9:
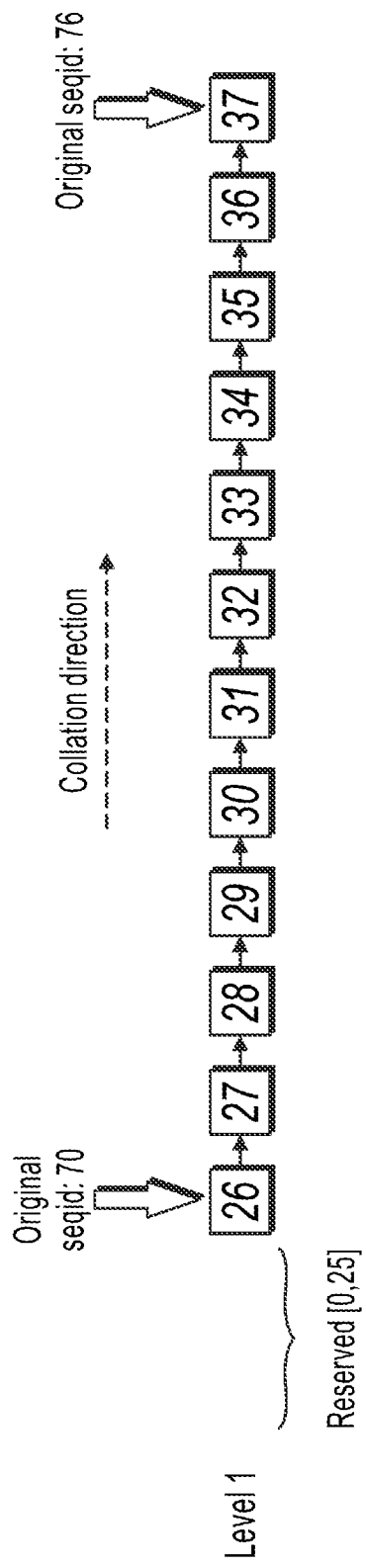
FIG. 9 is an example schematic diagram illustrating offline update of backward sequence number coding in an index entry generating method for a large object data block index, according to some embodiments of this specification.

FIG. 7 to FIG. 9 are schematic diagrams illustrating some specific applications of offline code update in an index entry generating method for a large object data block index, according to some embodiments of this specification.

According to the above-mentioned coding method in some embodiments of this specification, in the worst case, coding may not be continued after 32k times of coding, and the coding space is used up. In such case, an offline update task of a server back end can be triggered.

Alternatively, when the maximum coding length of the large object exceeds 8k, the offline update task of the server back end can also be triggered.

It is worthwhile to note that the offline update task provided in some embodiments of this specification does not need to perform global update on sequence number codes of all stored large object data block indexes, and only needs to perform partial update on related sequence number codes in an update range. For example, only all sequence number codes with the sequence number codes 16 to 24 can be updated.

In the above-mentioned description of the offline update task in some embodiments of this specification, updating sequence number codes again means performing sequence number coding again on sequence number codes within a specific range so as to combine branch codes within a specific range. In practice, when codes in a small range are sorted again, sequence number codes that need to be recoded can be loaded into a memory, and then these records are deleted from the database. The sequence number codes are sorted and coded again in the memory, and finally, the updated sequence number codes are inserted into the database again.

In an extreme case, all sequence number codes may need to be updated again, and all sequence number codes are loaded into the memory in advance. In such case, in some actual application scenarios, the above-mentioned code update method may not be necessarily implemented, and a primary key conflict occurs. In other words, the updated sequence number codes overlap the existing sequence number codes to some extent, and consequently, the updated sequence number codes include at least two duplicate codes.

For example, all sequence number codes in FIG. 5 are updated again. The method in which one sequence number code is loaded and one sequence number code is modified is used to update and combine all branch sequence number codes into the first level. As such, the original branch sequence number codes 1.1, 1.2, and 1.3 are updated to sequence number codes 2, 3, and 4, which overlap the existing sequence number codes 2, 3, and 4 at the first level, causing a primary key conflict.

To avoid such a case, in some embodiments of this specification, two methods shown in FIG. 7 to FIG. 9 are used to update sequence number codes. In some embodiments of this specification, a coding interval is defined as [0, 100].

FIG. 7 is a schematic diagram illustrating a status after an offline update task is started after the sequence number code 3 is inserted in the application scenario shown in FIG. 5.

In some embodiments of this specification, a method for updating from rear to front is used. During the update, a coding interval of [76, 100] is reserved to facilitate a subsequent data appending operation.

During the code update, the sequence number code 75 is used as a start update point, and the original sequence number code 3 within the update range is updated to generate a new sequence number code 75. The update is performed from rear to front, and by analogy, the first sequence number code 1 is updated again to a sequence number code 70. As such, branch codes among the original codes 1 to 3 are combined and updated into the first level codes.

FIG. 8 is a schematic diagram illustrating an operation after sequence number coding is continued on the basis of FIG. 7. To be specific, a sequence number code 4 is appended, and then a plurality of sequence number codes are inserted between the sequence number codes 3 and 4 to form two branches of codes.

FIG. 9 is a schematic diagram illustrating a specific application after an offline update task is performed on FIG. 8. In some embodiments of this specification, codes are updated based on a sequence from front to rear. During the update, a coding interval of [0, 25] is reserved for use by a possible data insertion operation.

The sequence number code 26 is used as a start update point, i.e., the first original sequence number code 70 is updated to the sequence number code 26. By analogy, the update is performed from front to rear, and the last original sequence number code 76 is updated to the sequence number code 37. As such, all the original three-level branch codes are combined and updated into the first level codes.

Based on the same inventive idea, some embodiments of this specification further provide an apparatus corresponding to the above-mentioned method.

Figure 10:
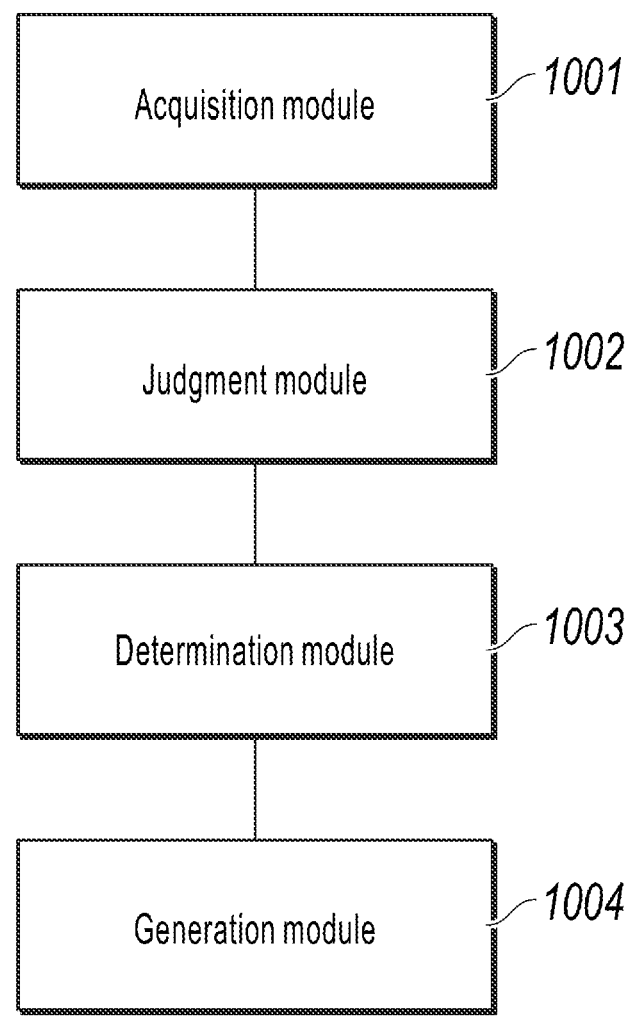
FIG. 10 is a schematic structural diagram illustrating an index entry generating apparatus for a large object data block index corresponding to FIG. 1, according to some embodiments of this specification.

FIG. 10 is a schematic structural diagram illustrating an index entry generating apparatus for a large object data block index corresponding to FIG. 1, according to some embodiments of this specification.

In some embodiments of this specification, a mapping relationship between a large object data block index and a storage location of a large object data piece is constructed in advance, and sequence number coding is performed on the large object data block index successively based on a predetermined sequence.

As shown in FIG. 10, the apparatus can include: an acquisition module 1001, configured to acquire a first sequence number, where the first sequence number is a sequence number of front large object data that are in stored large object data and that are adjacent to target data in a data dimension, the target data are to-be-inserted data that need to be inserted into the stored large object data, and the first sequence number is generated based on a first code arrangement sequence; a judgment module 1002, configured to determine, based on the first code arrangement sequence, whether a second sequence number that is adjacent to the first sequence number and that is located after the first sequence number is occupied, to obtain a first determining result; a determination module 1003, configured to: in response to that the first determining result indicates that the second sequence number is occupied, determine a branch index sequence number of the target data in the large object data block index based on a second code arrangement sequence; and a generation module 1004, configured to add an index entry including the branch index sequence number to the large object data block index, where a location of the index entry including the branch index sequence number in the large object data block index is disposed between an index entry of the first sequence number and an index entry of the second sequence number.

Based on the apparatus in FIG. 10, some embodiments of this specification further provide some specific implementations of the apparatus, which are described below.

Optionally, the apparatus can further include: in response to that the first determining result indicates that the second sequence number is not occupied, determining, based on the first code arrangement sequence, the second sequence number that is adjacent to the first sequence number and that is located after the first sequence number as a sequence number corresponding to the target data.

Optionally, the second code arrangement sequence can specifically include: in response to that a coding form of the first sequence number is a value, a coding form of the branch index sequence number is also a value, and a value corresponding to the branch index sequence number is greater than a value corresponding to the first sequence number.

Optionally, before the acquiring a first sequence number, the apparatus can further include: reserving a backup coding interval of a predetermined coding length in a coding interval of the first code arrangement sequence, where the backup coding interval is used for subsequent sequence number coding for the to-be-inserted target data.

Optionally, the apparatus can further include: in response to that a coding length of the stored sequence number exceeds a predetermined coding length, triggering an offline update operation on the stored sequence number.

Optionally, the performing an offline update operation on the stored sequence number can specifically include: determining, based on a sequence number of a stored index entry, an index entry that needs to be collated, where a sequence number of the index entry that needs to be collated includes at least a sequence number based on the first code arrangement sequence and a sequence number based on the second code arrangement sequence; and performing sequence number coding again on the index entry that needs to be collated based on the first code arrangement sequence.

Optionally, before the performing sequence number coding again on the index entry that needs to be collated based on the first code arrangement sequence, the apparatus can further include: determining a coding interval used for performing sequence number coding again; and reserving a coding interval of a predetermined range in the coding interval used for performing sequence number coding again, where the coding interval of the predetermined range is used for subsequent sequence number coding for the to-be-stored target data.

Optionally, the performing sequence number coding again on the index entry that needs to be collated based on the first code arrangement sequence can include: determining one of two endpoint sequence numbers of the reserved coding interval of the predetermined range as a start sequence number; and performing sequence number coding again on a sequence number of the index entry that needs to be collated, by using the start sequence number as a collation start point.

Optionally, the performing sequence number coding again on a sequence number of the index entry that needs to be collated, by using the start sequence number as a collation start point can include: in response to that the start sequence number is a front endpoint sequence number in the coding interval of the predetermined range, performing sequence number coding again on the sequence number of the index entry that needs to be collated from rear to front in a direction opposite to an arrangement sequence of the sequence number of the index entry that needs to be collated, by using the start sequence number as the collation start point.

Optionally, the performing sequence number coding again on a sequence number of the index entry that needs to be collated, by using the start sequence number as a collation start point can include: in response to that the start sequence number is a rear endpoint sequence number in the coding interval of the predetermined range, performing sequence number coding again on the sequence number of the index entry that needs to be collated from front to rear in an arrangement sequence of the sequence number of the index entry that needs to be collated, by using the start sequence number as the collation start point.

According to the index entry generating apparatus for a large object data block index provided in some embodiments of this specification, when target data are inserted, a first sequence number of front large object data that are in stored large object data and that are adjacent to the target data in a data dimension is acquired. It is determined, based on the first code arrangement sequence, whether a second sequence number that is adjacent to the first sequence number and that is located after the first sequence number is occupied, to obtain a first determining result. In response to that the first determining result indicates that the second sequence number is occupied, a branch index sequence number of the target data in the large object data block index is determined based on a second code arrangement sequence. An index entry including the branch index sequence number is added to the large object data block index. A location of the index entry including the branch index sequence number in the large object data block index is disposed between an index entry of the first sequence number and an index entry of the second sequence number.

A first sequence number is acquired. When a second sequence number is occupied, a branch index sequence number of the target data is determined based on a second code arrangement sequence different from a first code arrangement sequence, and an index entry including the branch index sequence number is added to a large object data block index. As such, management of the large object data is converted into management of the large object data block index, thereby effectively alleviating a read/write amplification problem during the large object management. In addition, using a branch index sequence number coding method can avoid impact on a sequence number coding sequence of the stored large object data block index, without a need to perform coding again on all large object data block indexes, thereby effectively simplifying a data insertion operation procedure.

Based on the same inventive idea, some embodiments of this specification further provide a device corresponding to the above-mentioned method.

Figure 11:
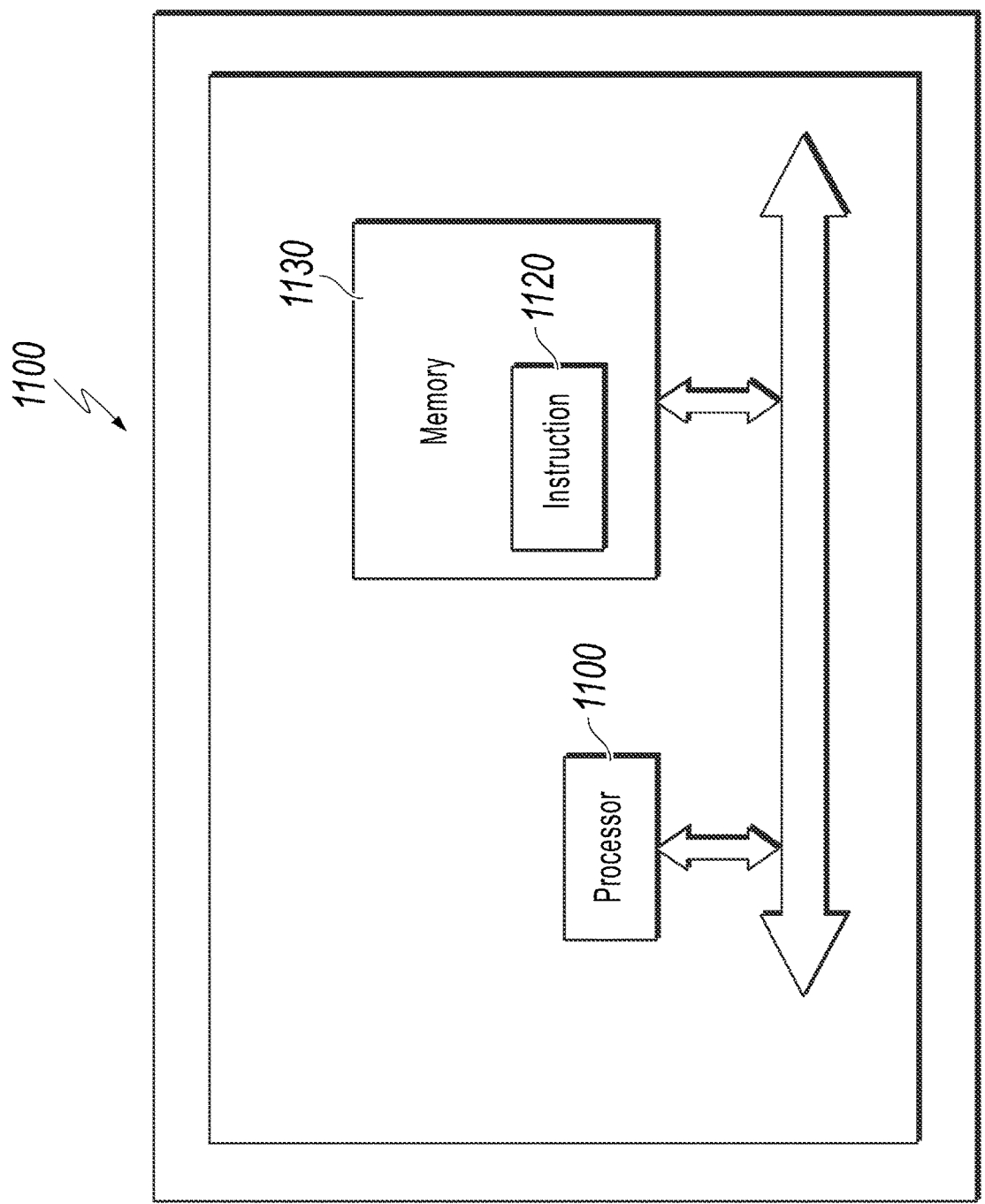
FIG. 11 is a schematic structural diagram illustrating an index entry generating device for a large object data block index corresponding to FIG. 1, according to some embodiments of this specification.

FIG. 11 is a schematic structural diagram illustrating an index entry generating device for a large object data block index corresponding to FIG. 1, according to some embodiments of this specification. As shown in FIG. 11, the device 1100 can include: at least one processor 1110; and a memory 1130 communicatively connected to the at least one processor, where the memory 1130 stores an instruction 1120 that can be executed by the at least one processor 1110, and the instruction is executed by the at least one processor 1110, to enable the at least one processor 1110 to perform the following operations: acquiring a first sequence number, where the first sequence number is a sequence number of front large object data that are in stored large object data and that are adjacent to target data in a data dimension, the target data are to-be-inserted data that need to be inserted into the stored large object data, and the first sequence number is generated based on a first code arrangement sequence; determining, based on the first code arrangement sequence, whether a second sequence number that is adjacent to the first sequence number and that is located after the first sequence number is occupied, to obtain a first determining result; in response to that the first determining result indicates that the second sequence number is occupied, determining a branch index sequence number of the target data in the large object data block index based on a second code arrangement sequence; and adding an index entry including the branch index sequence number to the large object data block index, where a location of the index entry including the branch index sequence number in the large object data block index is disposed between an index entry of the first sequence number and an index entry of the second sequence number.

Some embodiments of this specification are described in a progressive way. For same or similar parts of some embodiments, mutual references can be made to the embodiments. Each embodiment focuses on a difference from other embodiments. Particularly, the device shown in FIG. 11 is briefly described since the device is basically similar to some method embodiments. For related parts, references can be made to related descriptions in the method embodiments.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit to obtain a corresponding hardware circuit structure. Therefore, a method procedure can be improved using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the some described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using only the computer-readable program code, logic programming can be performed on method steps to enable the controller to implement the same function in forms of the logic gate, the switch, the application-specific integrated circuit, the programmable logic controller, the embedded microcontroller, etc. Therefore, the controller can be considered as a hardware component, and an apparatus included in the controller for implementing various functions can also be considered as a structure in the hardware component. Alternatively, the apparatus configured to implement various functions can even be considered as both a software module implementing the method and a structure in the hardware component.

The system, apparatus, module, or unit illustrated in the above-mentioned embodiments can be specifically implemented by using a computer chip or an entity, or can be implemented by using a product having a specific function. A typical implementation device is a computer. Specifically, for example, the computer can be a personal computer, a laptop computer, a cellular phone, a camera phone, a smart phone, a personal digital assistant, a media player, a navigation device, an e-mail device, a game console, a tablet computer, a wearable device, or any combination of these devices.

For ease of description, the above-mentioned apparatus is described by dividing functions into various units. Certainly, when this application is implemented, the functions of each unit can be implemented in one or more pieces of software and/or hardware.

A person skilled in the art should understand that some embodiments of this application can be provided as a method, a system, or a computer program product. Therefore, this application can use a form of hardware only embodiments, software only embodiments, or embodiments with a combination of software and hardware. Further, this application can take a form of a computer program product implemented on one or more computer-usable storage media (including but not limited to a disk memory, a CD-ROM, an optical memory, and the like) containing computer-usable program code.

This application is described with reference to the flowcharts and/or block diagrams of the method, the device (system), and the computer program product according to some embodiments of this application. It should be understood that each process and/or each block in the flowcharts and/or the block diagrams and a combination of a process and/or a block in the flowcharts and/or block diagrams can be implemented by computer program instructions. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

These computer program instructions can be stored in a computer-readable memory that can instruct the computer or the another programmable data processing device to work in a specific way, so the instructions stored in the computer-readable memory generate an artifact that includes an instruction apparatus. The instruction apparatus implements a specific function in one or more processes in the flowcharts and/or in one or more blocks in the block diagrams.

These computer program instructions can alternatively be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory may include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes a persistent and a non-persistent, a removable and a non-removable medium, which can implement information storage by using any method or technology. Information can be a computer-readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette tape, a cassette magnetic disk storage, or another magnetic storage device, or any other non-transmission media, which can be configured to store information that can be accessed by a computing device. Based on the definition in this specification, the computer-readable medium does not include transitory media such as a modulated data signal and carrier.

It is worthwhile to further note that, the terms "include", "comprise", or any other variant thereof are intended to cover a non-exclusive inclusion, so that a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that some embodiments of this application can be provided as methods, systems, or computer program products. Therefore, this application can use a form of hardware only embodiments, software only embodiments, or embodiments with a combination of software and hardware. Moreover, this application can use a form of a computer program product that is implemented on one or more computer-usable storage media (including but not limited to a magnetic disk storage, a CD-ROM, an optical memory, and the like) that include computer-usable program code.

This application can be described in a general context of a computer-executable instruction that is executed by a computer, for example, a program module. Generally, the program module includes a routine, a program, an object, a component, a data structure, etc. executing a specific task or implementing a specific abstract data type. This application can alternatively be practiced in distributed computing environments in which tasks are performed by remote processing devices that are connected through a communication network. In the distributed computing environments, the program module can be located in a local and remote computer storage medium including a storage device.

The above-mentioned descriptions are merely some embodiments of this application, and are not intended to limit this application. A person skilled in the art can make various changes and variations to this application. Any modification, equivalent replacement, or improvement made without departing from the spirit and principle of this application shall fall within the scope of the claims in this application.

The invention claimed is:

1. A computer-implemented method, comprising:
acquiring a first sequence number of front large object data, wherein the front large object is comprised in a large object data and is adjacent to a target data to be inserted in the large object data, and wherein the first sequence number is generated based on a first code arrangement sequence and is comprised in a first index entry corresponding to the front large object data, wherein a coding interval of the first code arrangement sequence comprises a backup coding interval;
determining, based on the first code arrangement sequence, whether a second sequence number that immediately follows the first sequence number is occupied;
determining whether the backup coding interval is occupied;
in response to determining that the second sequence number is occupied and the backup coding interval is occupied, determining, based on a second code arrangement sequence, a branch index sequence number for the target data; and
adding an index entry comprising the branch index sequence number to an index of the large object data, wherein the index entry is added between the first index entry comprising the first sequence number and a second index entry comprising the second sequence number.

2. The computer-implemented method of claim 1, wherein the method further comprises:
in response to determining that the second sequence number is unoccupied, using the second sequence number as a sequence number of the target data.

3. The computer-implemented method of claim 1, wherein determining, based on the second code arrangement sequence, the branch index sequence number for the target data comprises:
in response to determining that a coding of the first sequence number is a value, determining a coding of the branch index sequence number as a value, wherein the value of branch index sequence number is larger than the value of the first sequence number.

4. The method according to claim 1, wherein the method further comprises:
before acquiring the first sequence number, determining the backup coding interval, wherein the backup coding interval has a predetermined coding length, and wherein a sequence number of the target data is generated by first using the backup coding interval.

5. The method according to claim 4, wherein the method further comprises:
in response to determining that a coding length of stored sequence numbers in the index of the large object data exceeds the predetermined coding length of the backup coding interval, performing an offline update operation on the stored sequence numbers.

6. The method according to claim 5, wherein performing an offline update operation on the stored sequence numbers comprises:
determining a plurality of index entries to be re-coded, wherein sequence numbers comprised in the plurality of index entries to be re-coded comprise at least:
a sequence number based on the first code arrangement sequence; and
a sequence number based on the second code arrangement sequence; and
re-coding the plurality of index entries based on the first code arrangement sequence.

7. The method according to claim 6, further comprising:
before re-coding the plurality of index entries based on the first code arrangement sequence:
determining a coding interval for re-coding in the first code arrangement sequence; and
determining a backup coding interval comprised in the coding interval, wherein a sequence number of the target data is generated by first using the backup coding interval.

8. The method according to claim 7, wherein re-coding the plurality of index entries based on the first code arrangement sequence comprises:
determining a start sequence number for re-coding, wherein the start sequence number is a sequence number at an endpoint of the backup coding interval; and
re-coding the plurality of index entries in the coding interval starting from the start sequence number.

9. The method according to claim 8, wherein re-coding the plurality of index entries in the coding interval starting from the start sequence number comprises:
in response to determining that the start sequence number is a sequence number at a front endpoint of the backup coding interval, re-coding the plurality of index entries in the coding interval in a rear-to-front direction, wherein:
a rear index entry of the plurality of index entries is re-coded to comprise a sequence number immediately before the start sequence number; and
a front index entry of the plurality of index entries is recoded to comprise a sequence number smaller than the sequence number of the rear index entry.

10. The method according to claim 8, wherein re-coding the plurality of index entries in the coding interval starting from the start sequence number comprises:
in response to determining that the start sequence number is a sequence number at a rear endpoint of the backup coding interval, re-coding the plurality of index entries in the coding interval in a front-to-rear direction, wherein:
a front index entry of the plurality of index entries is re-coded to comprise a sequence number immediately after the start sequence number; and
a rear index entry of the plurality of index entries is recoded to comprise a sequence number larger than the sequence number of the front index entry.

11. A non-transitory, computer-readable medium storing one or more instructions executable by a computer system to perform operations comprising:
acquiring a first sequence number of front large object data, wherein the front large object is comprised in a large object data and is adjacent to a target data to be inserted in the large object data, and wherein the first sequence number is generated based on a first code arrangement sequence and is comprised in a first index entry corresponding to the front large object data, wherein a coding interval of the first code arrangement sequence comprises a backup coding interval;

determining, based on the first code arrangement sequence, whether a second sequence number that immediately follows the first sequence number is occupied;

determining whether the backup coding interval is occupied;

in response to determining that the second sequence number is occupied and the backup coding interval is occupied, determining, based on a second code arrangement sequence, a branch index sequence number for the target data; and adding an index entry comprising the branch index sequence number to an index of the large object data, wherein the index entry is added between the first index entry comprising the first sequence number and a second index entry comprising the second sequence number.

12. The non-transitory, computer-readable medium of claim 11, wherein the operations further comprise:
in response to determining that the second sequence number is unoccupied, using the second sequence number as a sequence number of the target data.

13. The non-transitory, computer-readable medium of claim 11, wherein determining, based on the second code arrangement sequence, the branch index sequence number for the target data comprises:
in response to determining that a coding of the first sequence number is a value, determining a coding of the branch index sequence number as a value, wherein the value of branch index sequence number is larger than the value of the first sequence number.

14. The non-transitory, computer-readable medium of claim 11, wherein the operations further comprise:
before acquiring the first sequence number, determining the backup coding interval comprised, wherein the backup coding interval has a predetermined coding length, and wherein a sequence number of the target data is generated by first using the backup coding interval.

15. The non-transitory, computer-readable medium of claim 14, wherein the operations further comprise:
in response to determining that a coding length of stored sequence numbers in the index of the large object data exceeds the predetermined coding length of the backup coding interval:
determining a plurality of index entries to be re-coded, wherein sequence numbers comprised in the plurality of index entries to be re-coded comprise at least:
a sequence number based on the first code arrangement sequence; and
a sequence number based on the second code arrangement sequence; and
re-coding the plurality of index entries based on the first code arrangement sequence.

16. The non-transitory, computer-readable medium of claim 15, wherein the operations further comprise:
before re-coding the plurality of index entries based on the first code arrangement sequence:
determining a coding interval for re-coding in the first code arrangement sequence; and
determining a backup coding interval comprised in the coding interval, wherein a sequence number of the target data is generated by first using the backup coding interval.

17. The non-transitory, computer-readable medium of claim 15, wherein re-coding the plurality of index entries based on the first code arrangement sequence comprises:
determining a start sequence number for re-coding, wherein the start sequence number is a sequence number at an endpoint of the backup coding interval; and
re-coding the plurality of index entries in the coding interval starting from the start sequence number.

18. The non-transitory, computer-readable medium of claim 17, wherein re-coding the plurality of index entries in the coding interval starting from the start sequence number comprises:
in response to determining that the start sequence number is a sequence number at a front endpoint of the backup coding interval, re-coding the plurality of index entries in the coding interval in a rear-to-front direction, wherein:
a rear index entry of the plurality of index entries is re-coded to comprise a sequence number immediately before the start sequence number; and
a front index entry of the plurality of index entries is recoded to comprise a sequence number smaller than the sequence number of the rear index entry.

19. The non-transitory, computer-readable medium of claim 17, wherein re-coding the plurality of index entries in the coding interval starting from the start sequence number comprises:
in response to determining that the start sequence number is a sequence number at a rear endpoint of the backup coding interval, re-coding the plurality of index entries in the coding interval in a front-to-rear direction, wherein:
a front index entry of the plurality of index entries is re-coded to comprise a sequence number immediately after the start sequence number; and
a rear index entry of the plurality of index entries is recoded to comprise a sequence number larger than the sequence number of the front index entry.

20. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
acquiring a first sequence number of front large object data, wherein the front large object is comprised in a large object data and is adjacent to a target data to be inserted in the large object data, and wherein the first sequence number is generated based on a first code arrangement sequence and is comprised in a first index entry corresponding to the front large object data, wherein a coding interval of the first code arrangement sequence comprises a backup coding interval;
determining, based on the first code arrangement sequence, whether a second sequence number that immediately follows the first sequence number is occupied;
determining whether the backup coding interval is occupied;

in response to determining that the second sequence number is occupied and the backup coding interval is occupied, determining, based on a second code arrangement sequence, a branch index sequence number for the target data; and adding an index entry comprising the branch index sequence number to an index of the large object data, wherein the index entry is added between the first index entry comprising the first sequence number and a second index entry comprising the second sequence number.

* * * * *